United States Patent [19]

Benedyk

[11] 4,258,093

[45] Mar. 24, 1981

[54] MOLDING NONWOVEN, NEEDLE PUNCHED FABRICS INTO THREE DIMENSIONAL SHAPES

[75] Inventor: Joseph C. Benedyk, Highland Park, Ill.

[73] Assignee: Brunswick Corporation, Skokie, Ill.

[21] Appl. No.: 33,460

[22] Filed: Apr. 26, 1979

[51] Int. Cl.$^3$ ............................................. B32B 3/00
[52] U.S. Cl. ................................................. 428/85; 28/112; 156/72; 156/148; 156/242; 264/126; 428/95; 428/284; 428/287; 428/296; 428/298; 428/300; 428/921
[58] Field of Search ............... 428/85, 288, 296, 298, 428/300, 287, 920, 921, 284, 95; 156/148, 181, 72, 306, 242; 28/112; 264/122, 126

[56] References Cited

U.S. PATENT DOCUMENTS

| 2,331,321 | 10/1943 | Heaton | 156/62.2 |
|---|---|---|---|
| 2,464,301 | 3/1949 | Francis | 156/220 |
| 3,394,043 | 7/1968 | Parlm et al. | 418/97 |
| 3,449,486 | 6/1969 | Contractor et al. | 428/296 |
| 3,801,428 | 4/1974 | Striegler et al. | 428/296 |
| 4,118,530 | 10/1978 | Benedyk et al. | 428/97 |
| 4,131,664 | 12/1978 | Flowers et al. | 428/218 |
| 4,131,704 | 12/1978 | Erickson et al. | 428/300 |
| 4,140,071 | 2/1979 | Gee et al. | 428/300 |
| 4,181,762 | 1/1980 | Benedyk | 428/93 |
| 4,194,037 | 3/1980 | Stotter | 428/300 |

*Primary Examiner*—James J. Bell
*Attorney, Agent, or Firm*—John G. Heimovics; William G. Lawler, Jr.

[57] ABSTRACT

Three dimensional shapes, typically of convex-concave form and having sufficient rigidity to maintain that form are molded from nonwoven, needlepunched fabrics containing certain ethylene-vinyl acetate fibers in admixture with fibers of a higher melting point polymer. Molding is accomplished by heating the fabric to a temperature whereat the ethylene-vinyl acetate fibers soften or melt but below the melting point of the other fibers and thereafter pressing the fabric between the mating faces of a mold pair and allowing the ethylene-vinyl acetate fibers to solidify and cool while in the mold.

29 Claims, 4 Drawing Figures

MOLDING NONWOVEN, NEEDLE PUNCHED FABRICS INTO THREE DIMENSIONAL SHAPES

CROSS-REFERENCES TO RELATED APPLICATIONS

This application is related to the co-pending applications of Joseph C. Benedyk, Ser. No. 17,465, Docket No. 3982Y-N-USA, entitled "Fibers, Yarns and Fabrics of Low Modulus Polymer" and to Ser. No. 33,459, entitled "Structural Fiber Panels and Method for their Manufacture."

BACKGROUND OF THE INVENTION

This invention relates to a forming process for making shaped articles from nonwoven, needlepunched fabrics and to articles produced thereby.

More particularly this invention relates to a process for shaping nonwoven, needlepunched fabrics to a substantially three dimensional, convex-concave shape having sufficient rigidly as to permanently retain that shape.

In a specific embodiment, this invention relates to fabric liners and coverings for shaped objects and structures such as vehicle compartment head and side liners, chair coverings and the like.

DISCUSSION OF THE PRIOR ART

The use of fabrics as liners and coverings to overlay structural shapes is of course very well known to the art. However, the use of fabrics to cover three-dimensional, convex-concave shapes having a moderate to high degree of relief presents considerable difficulty. As those fabrics appropriate and desirable for use as liners and coverings typically display a low degree of stretch, it is usually necessary to cut and form the fabric into a complex shape in order to obtain a reasonable degree of conformity to the structural shape. Otherwise, the fabric covering displays wrinkles, folds and bulges over and about those areas of the structural shape having a rapidly changing topography.

Nonwoven, needlepunched fabrics of various weights are also well known to the art and such fabrics have found use as carpeting, especially of the "indoor-outdoor" type. Needle-punched fabrics are of two basic types: those built on a scrim and those of the scrimless variety. Both fabric types are manufactured using similar techniques. A uniform web of staple length fibers is deposited either onto a scrim or onto a floating bed and the web is thereafter needlepunched. Needle-punching is accomplished by passing the web through a conventional needlepunching loom wherein multiple barbed needles penetrate the web at closely spaced intervals to entangle and lock the fibers together to form a coherent fabric. While both types of fabrics are similar in appearance and general properties, the scrimless fabric displays less dimensional stability, or can be more easily stretched, than can the fabric built on a scrim. In most fabric applications, the dimensional stability imparted by the scrim is considered to be desirable.

The concept of melt bonding fabrics by incorporating therein a low melting point thermoplastic fiber has long been known. For example, U.S. Pat. No. 2,331,321 discloses blending thermoplastic fibers with non-thermoplastic fibers to form a fabric. The fabric is thereafter subjected to heating whereby the thermoplastic fiber is melted which bonds the other fibers within the fabric. Callulose acetate was disclosed as a preferred thermoplastic fiber and other thermoplastics including vinyl chloride and vinyl acetate were suggested as being appropriate for use.

Finally, the shaping of thermoplastic sheet material into a variety of three dimensional shapes by molding under heat and pressure is well known and routinely practiced. As typically practiced, such forming techniques involve the pressing of a heated sheet of thermoplastic material between the surfaces of a shaping mold to impart the desired configuration. The formed shape is then allowed to cool sufficiently while in the mold so that it retains its shape upon removal.

SUMMARY OF THE INVENTION

I have found that a fabric comprising a nonwoven, scrimless needlepunched web of particular low melting point ethylene-vinyl acetate fibers blended with fibers of a higher melting point polymer may be formed into three-dimensional, convex-concave shapes by heating the fabric to a temperature whereat the ethylene-vinyl acetate fibers soften or begin to melt and thereafter pressing the fabric between the complementary surfaces of a mold or die pair. After cooling within the mold, the formed fabric retains the mold shape and is then used as a liner or covering for a structural shape.

The low melting point fibers may be manufactured of certain ethylene-vinyl acetate resins heretofor considered completely unsuited for fiber use provided that certain criteria are met. The ethylene-vinyl acetate must have an elastic modulus in the range of about 5,000 to 60,000 psi and an ultimate tensile strength above about 2,000 psi and preferably in the range of about 5,000 to 20,000 psi. The fibers display a melting point typically ranging from about 90° to 125° C.

Thus, it is an object of my invention to shape fabrics into three dimensional forms.

It is another object of my invention to provide a method for shaping fabrics to conform to the surface contours of a complex shape.

A specific object of my invention is to provide fabric liners and coverings for use in vehicle compartments and like structures which conform in shape to the surface of the structure.

DISCUSSION AND DESCRIPTION OF THE INVENTION

The fabrics used in my invention comprise a needlepunched web containing fibers of two types. One fiber type comprises an ethylene-vinyl acetate copolymer having an elastic modulus in the range of about 5,000 to 60,000 psi while the second fabric type comprises one or more higher melting point thermoplastic resins such as polypropylene or nylon.

Ethylene-vinyl acetate copolymers are typically characterized as thermoplastic elastomers. The ethylene-vinyl acetate copolymers comprising the fabric used in my invention must have a certain degree of inelasticity and strength in order to be processed into fabric. If the fiber is too elastic, i.e. has an elastic modulus below about 5,000 psi, it will act like a rubber band stretching and returning to its original state during needling and similar fabric making processes. The fiber must also be strong enough to resist breaking during the fabric making operations. This requires an ultimate tensile strength of at least about 2,000 psi and preferably more than 5,000 psi.

The ethylene-vinyl acetate fibers useful in my invention display a melting point generally in the range of 90° C. to 125° C. depending upon their degree of cross-linking and vinyl acetate content. Melting points of ethylene-vinyl acetate copolymers tend to increase as the vinyl acetate content decreases. It is preferred to use copolymers having a vinyl acetate content between about 5% and 20% as copolymers with a vinyl acetate content below about 5% display an undesirably high melting point while copolymers having a vinyl acetate content above about 20% tend to display both an undesirably low melting point and elastic modulus.

Fibers of ethylene-vinyl acetate are used in admixture with fibers of a higher melting point polymer such as nylon or polypropylene. Polypropylene fibers, for example, typically display a melting point of about 165° C. while most nylon fibers have a melting point above about 215° C. Typical staple fibers of polypropylene and nylon display an elastic modulus above 200,000 psi and usually in the range of 300,000 to 600,000 psi or about an order of magnitude greater than that of ethylene-vinyl acetate.

Figure 1:
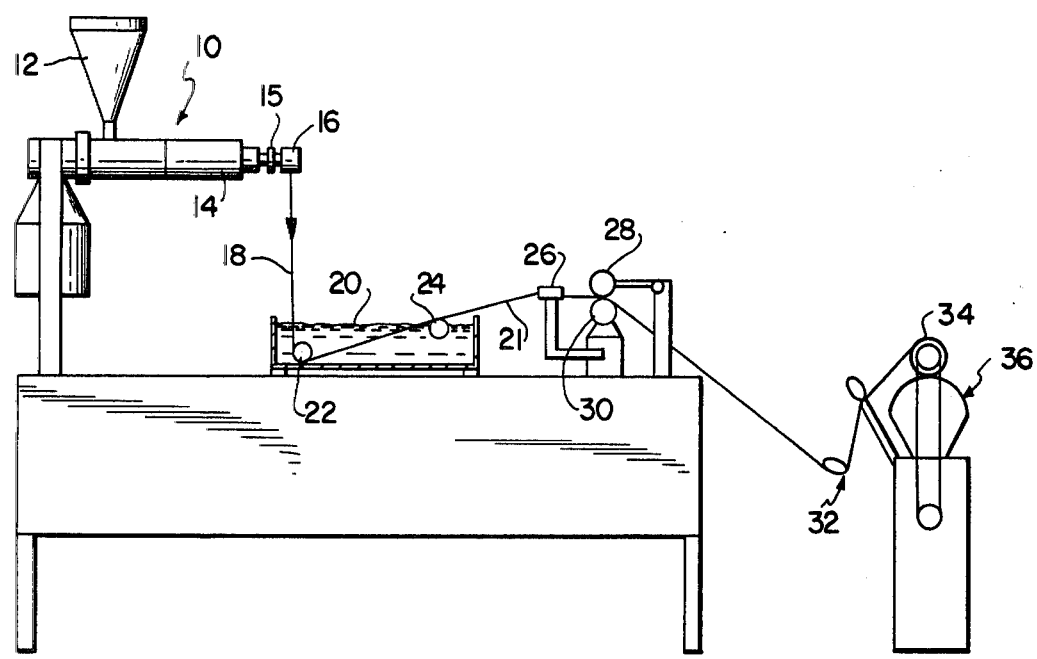
FIG. 1 is a side elevational view of an extruder and draw line appropriate for producing the low melting point fibers used in this invention.

Ethylene-vinyl acetate resin may be formed into fibers in the manner illustrated in FIG. 1. Referring to that figure, ethylene-vinyl acetate having the proper elastic modulus is extruded into a plurality of monofilaments using a conventional extruder 10 as is described in a paper presented by D. Poller and O. L. Riedly, "Effect of Monofilament Die Characteristics on Processability and Extrudate Quality;", 20 Annual SPE Conference, 1964, paper XXII-2. Extruder 10 includes a hopper 12 into which pellets of ethylene-vinyl acetate are loaded, and an extruder barrel 14 where the pellets are melted, a static mixer 15, and a spinnerette plate 16 through which the molten polymer is extruded.

The melted polymer leaves the spinnerette plate 16 as a plurality of molten strands 18 which are led downwardly into a quenching water bath 20 maintained at a temperature in the range of ambient to about 150° F. The molten polymer strands are chilled rapidly in the bath 20 and solidified to form continuous monofilament fibers 21. Fibers 21 pass around a pair of guides 22 and 24 and through a guide plate 26 into the nip of a pair of rollers 28 and 30. The speed of rollers 28 and 30 are set to pull on the fiber strands 18 so that each strand has a diameter of about 6 to about 15 mils and preferably from about 7 to 9 mils. After leaving rollers 28 and 30, the solid monofilaments passed through a fiber guide-braking system 32 and are wound about spools 34 mounted on winder 36.

Figure 2:
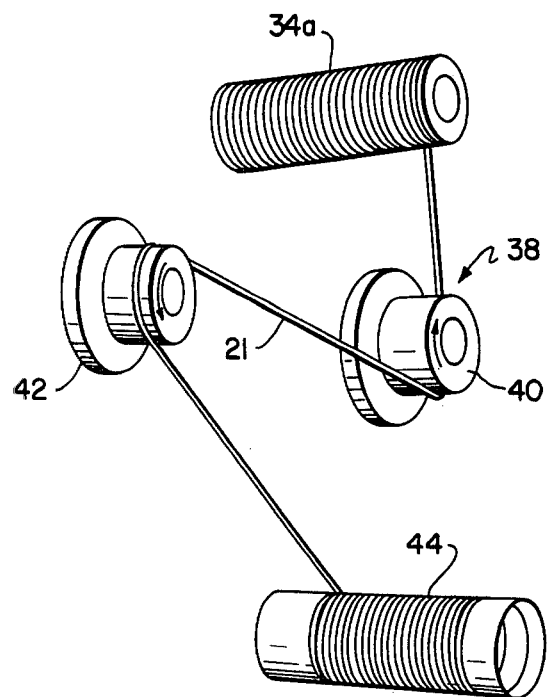
FIG. 2 illustrates a draw-winding apparatus for stretching the extruded fiber.

Turning now to FIG. 2, there is shown the drawing of monofilaments in the solid state. This solid state drawing is performed at a temperature below about 100° F. and reduces the diameter of the extruded monofilaments from about 6 to 15 mils to about 3 to 6 mils. A spool 34a, loaded with multiple strands of monofilaments, is removed from winder 36 of FIG. 1 and placed on the draw winding apparatus of 38. The lead ends of the fibers 21 on spool 34a are unwound, guided about two drawing godets 40 and 42, and wrapped around a second spool 44. Godets 40 and 42 turn at different angular velocities so that the fibers 21 coming off spool 34a are stretched or drawn.

Because the monofilament fibers of my invention are produced by extrusion through a spinnerette having relatively large orifices, typically having a diameter in the range of about 10 to 30 mils, it is possible to incorporate within the fiber a relatively high loading of solid fillers without plugging the spinnerette plate. This allows incorporation of pigments, solid fillers, and certain solid flame or fire retardants. Particle size of the solid additives may generally range from about 1 to 25 microns. Exemplary solid fillers include calcium silicate, aluminum silicate, carbon black, alumina, silicon dioxide and titanium dioxide. Total solids loading in the fiber may range as high as 20%.

As ethylene-vinyl acetate may be extruded into monofilaments at relatively low temperatures, typically below 500° F., it is possible to incorporate within the fiber certain solid flame or fire retardants which decompose at relatively low temperatures. A particularly preferred solid fire retardant is finely divided hydrated magnesia. As is well known in the art, hydrated magnesia is a low cost, highly effective fire retardant but one which can not be used in polymers extruded at high temperature.

Figure 3:
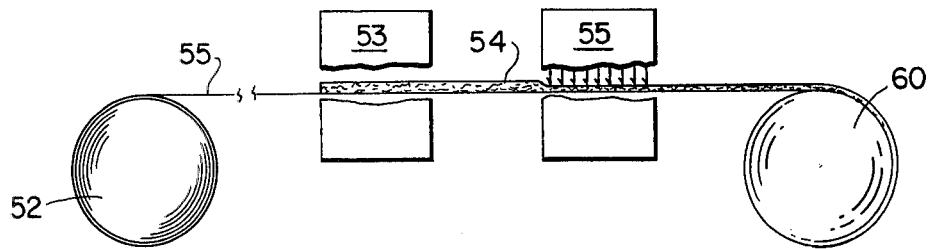
FIG. 3 is a schematic representation of a method for making the fabrics used in my invention.

Turning now to FIG. 3, there is illustrated a preferred method for the manufacture of nonwoven, needlepunched fabrics suitable for use in my invention. As the various pieces of apparatus used in this method of fabric manufacture are well known to the art, they have been shown only in block form and will not be described in detail.

In one preferred embodiment of my invention, ethylene-vinyl acetate fibers are incorporated into the back of a nonwoven, needlepunched, scrimless fabric of a higher melting point fiber such as nylon or polypropylene. This fabric retains its face appearance, feel and texture during and after the molding operation. A finished, needlepunched fabric 51, which may have a pile face as produced for example in a Dilo or Diloft machine, is fed face side down from a supply roll 52. A conventional lapper 53 is then used to deposit a uniform web or batt of garnetted staple fibers 54 on the back of fabric 51. Fibers 54 preferably comprise ethylene-vinyl acetate staple fibers mixed with staple fibers of other compositions including nylon, polypropylene and the like. In any event, the proportion of ethylene-vinyl acetate fibers on a weight basis must exceed about 5% of the composite fabric (fabric 51 plus web 54) and preferably does not exceed 50% of the composite fabric.

The fabric carrying a fiber web on its back surface is next passed through a needle loom 55, such as the standard Dilo loom, which needle bonds the fiber layer to the fabric back to form a composite, moldable fabric 58. After needle bonding, the composite fabric is wound onto a roll 60 for interim storage and transport.

Another embodiment of my invention may be described by general reference to FIG. 3. In this embodiment, a composite fabric is produced by depositing a web of staple fibers 54, comprising a mixture or blend of ethylene-vinyl acetate fibers and fibers of a higher melting point polymer onto a floating bed or similar support means using lapper 53. Fiber web 54 is then passed through needle loom 55 which needle bonds the mixed fibers into a fabric 58. This fabric is as before wound onto roll 60 for interim storage or transport.

Figure 4:
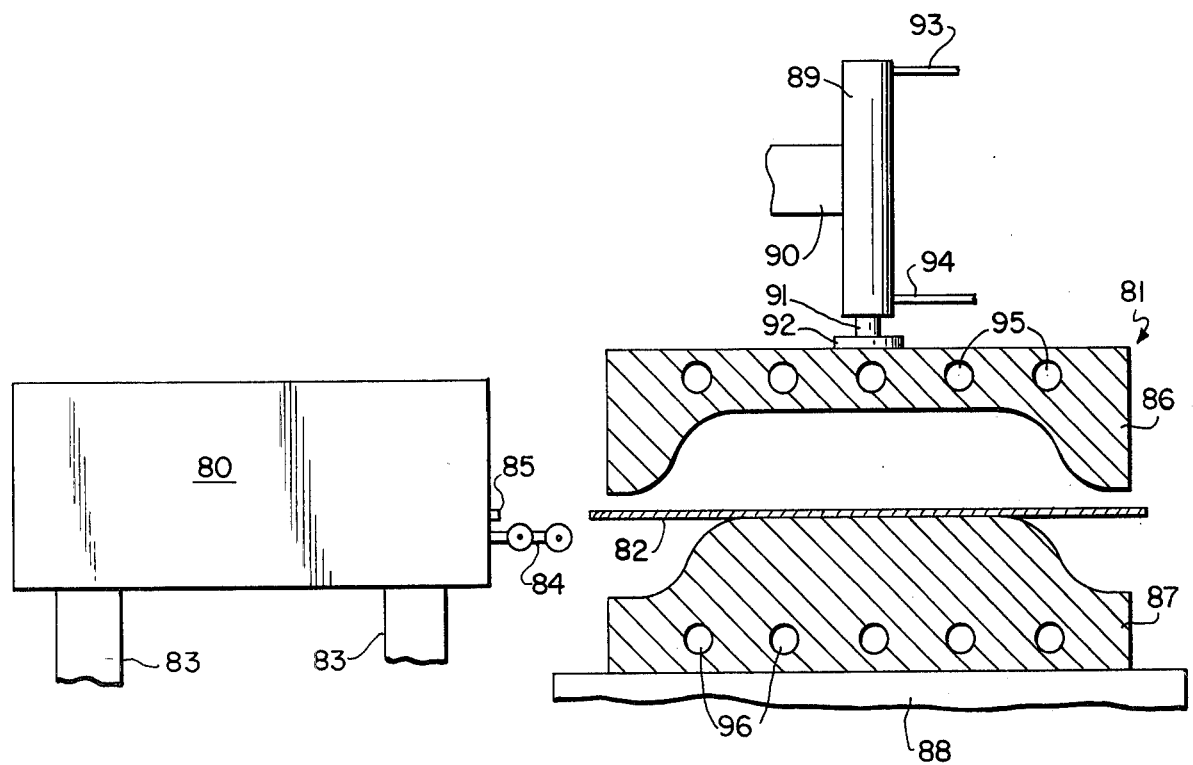
FIG. 4 illustrates heating and forming apparatus which may be used according to my invention for shaping fabric into three dimensional configurations.

FIG. 4 illustrates apparatus used in forming or molding fabrics of the type previously described into three dimensional shapes. The apparatus comprises a heating oven or chamber 80 and a molding machine 81. A fabric portion 82 of appropriate size is first heated in oven 80 to a temperature whereat the ethylene-vinyl acetate fibers begin to soften or melt but below the softening or melting point of the other thermoplastic fibers in the fabric. This temperature will generally range from about 90° C. to 150° C. and more usually within the range of about 100° C. to 125° C. Heating may be accomplished within oven 80 in any conventional way, as by conduction, convection or radiation. Either infrared radiation heating or hot gas convection heating are preferred.

Oven 80 is mounted on support means 83 in close proximity to molding means 81. Transfer means 84 are provided on one side of the oven to transport a heated fabric piece through exit port 85 for placement between mold or die members 86 and 87. Mold members 86 and 87 are arranged to be relatively movable one toward the other from an open position as shown to a closed, mating fit position.

One of the mold members, illustrated as male mold 87, is mounted on a stationary support 88 while the other, or female member 86, is relatively movable in a vertical direction. Movement of mold member 86 may conveniently be controlled by the action of a double acting hydraulic or pneumatic cylinder 89 which is fixidly supported by structural means 90. The piston end 91 of cylinder 89 is attached to a top portion of mold member 86 by way of mounting plate 92. The relative position of piston 91 and mold member 86 is controlled by fluid movement into and out of cylinder 89 by way of conduits 93 and 94 as is well known in the art.

Means may also be provided for adjusting and controlling the temperature of each mold member. Such means are illustrated diagrammatically as a plurality of cored holes 95 in mold member 86 and 96 in mold member 87. A suitable heat transfer fluid may be circulated through these cored holes to adjust or maintain the temperature of the mold.

In operation, a heated fabric piece is inserted between the open mold members which are then closed by action of cylinder 89. As the mold members close to a mating position, the fabric 82 is stretched and shaped to conform to the mold contour. The mold members are retained in a closed position for a sufficient time to allow the softened or melted ethylene-vinyl acetate fibers to cool and harden. Thereafter, the mold is opened, the shaped fabric removed, and the cycle repeated.

The importance of using a needlepunched, nonwoven fabric in the molding process of my invention can now be appreciated. As the fabric is shaped between the mold faces, portions of the fabric are stretched while other portions are compressed. A woven fabric, for example, has a high degree of dimensional stability and resists stretching. This property, while highly desirable in most fabric uses, precludes successful molding to a three dimensional shape. For the same reason, needlepunched, nonwoven fabrics built on a scrim base are generally not satisfactory for use in my process. An exception are those scrim materials which are either elastic enough to allow fabric stretching and compression or of such low strength as to freely break during the molding process so as to allow fabric stretching.

In some instances, it may be advantageous to further enhance the physical properties of the ethylene-vinyl acetate fibers contained in the shaped fabric by partially cross-linking the polymer. As cross-linking increases the melting point of ethylene-vinyl acetate, this procedure must be performed after the fabric is shaped or molded.

Most preferably, cross-linking is achieved by irradiating the shaped fabric with an electron beam. Radiation dosage should be sufficient to cross-link the polymer to give a gel content greater than 30% but less than 90%. In most cases, the preferred gel content is in the range of 45–55%. Gel content may be determined in conventional fashion by a solvent extraction in hot xylene.

Efficiency of radiation cross-linking is substantially enhanced by incorporating finely divided silicon dioxide or titanium dioxide within the polymer. Particle size of these oxides may range between about 100 angstroms and 1 micron and the amount used is generally below 1 volume percent. Ethylene-vinyl acetate polymers for example irradiated at a dosage of 10 megarads (MR) will typically display a gel content of 25 to 28 percent. Irradiation of the same polymer containing 0.2 volume % silicon dioxide results in a gel content of about 40–45% at the same dosage level.

As has been set out previously, the proportion of ethylene-vinyl acetate to higher melting point fibers in the fabric being molded may range from about 5:95 to about 50:50 on a weight basis. The fiber proportion used for any particular application depends primarily upon the stiffness and dimensional stability required in the shaped fabric. As a general rule, the higher the proportion of ethylene-vinyl acetate in the fabric, the greater will be the stiffness and rigidity of the finished shape.

My process is particularly well suited to the manufacture of three dimensional, convex-concave liners and coverings for vehicle side walls, wheel wells and compartments. In these applications, it is preferred that the fabric used for molding have ethylene-vinyl acetate fibers incorporated only into the back portion. This embodiment provides an attractive and decorative fabric face with the appearance and feel of conventional, non-molded fabrics.

I claim:

1. A method for making a three dimensional fabric shape having sufficient rigidity to maintain that shape which comprises:
    forming a nonwoven, needlepunched fabric containing at least 5% by weight of fibers of ethylene-vinyl acetate in admixture with fibers of a higher melting polymer, said ethylene-vinyl acetate fibers having an elastic modulus in excess of 5,000 psi;
    heating the fabric to a temperature above the softening point of said ethylene-vinyl acetate fibers but below the temperature at which the fibers of said higher melting point polymer begin to soften and melt;
    pressing said heated fabric between the faces of a complementary mold pair, and
    allowing the shaped fabric to cool to a temperature below the softening point of said ethylene-vinyl acetate before removing it from the mold.

2. The method of claim 1 wherein said mold pair defines a generally convex-concave shape.

3. The method of claim 2 wherein the ratio of ethylene-vinyl acetate fibers to higher melting point fibers ranges from 5:95 to 50:50.

4. The method of claim 3 wherein said higher melting point fibers are selected from the group consisting of polypropylene, polyamide and mixtures thereof.

5. The method of claim 4 wherein said higher melting point fibers comprise polypropylene.

6. The method of claim 4 wherein said higher melting point fibers comprise polyamide.

7. The method of claim 3 wherein said ethylene-vinyl acetate fibers have an elastic modulus in the range of about 5,000 to 60,000 psi and an ultimate tensile strength above about 5,000 psi.

8. The method of claim 7 wherein the vinyl acetate content of said ethylene-vinyl acetate is in the range of 5% to 20%.

9. The method of claim 7 wherein said ethylene-vinyl acetate fibers have dispersed therein one or more additives selected from the group consisting of pigments, fillers and fire retardants in an amount up to 20% by weight.

10. The method of claim 9 wherein said fire retardant comprises finely divided hydrated magnesia.

11. The method of 3 wherein said ethylene-vinyl acetate fibers comprise a web needled onto the back of a nonwoven, needlepunched, scrimless fabric of a higher melting point fiber.

12. The method of claim 11 wherein said higher melting point fiber comprises polyamide.

13. The method of claim 11 wherein said higher melting point fiber comprises polypropylene.

14. The method of claim 11 wherein said fabric of a higher melting point fiber has a pile face.

15. The method of claim 3 wherein staple fibers of ethylene-vinyl acetate are blended with staple fibers of said higher melting point fiber to form a web which is needlepunched to form a fabric.

16. The method of claim 3 wherein said fabric is heated to a temperature in the range of about 90° C. to 150° C. and is thereafter pressed to a three dimensional shape.

17. A three dimensional shaped fabric having sufficient rigidity to maintain that shape comprising a blend of fused ethylene-vinyl acetate fibers with unfused fibers of a higher melting point polymer, said ethylene-vinyl acetate fibers having an elastic modulus in the range of about 5,000 to 60,000 psi and being needled into the back of a nonwoven, needlepunched, scrimless fabric of said higher melting point fibers.

18. The shaped fabric of claim 17 wherein the ratio of ethylene-vinyl acetate fibers to higher melting point fibers ranges from 5:95 to 50:50.

19. The shaped fabric of claim 18 wherein said higher melting point fiber is selected from the group consisting of polyamide, polypropylene and mixtures thereof.

20. The shaped fabric of claim 18 wherein said higher melting point fiber is polyamide.

21. The shaped fabric of claim 18 wherein said higher melting point fiber is polypropylene.

22. The shaped fabric of claim 18 wherein said ethylene-vinyl acetate fibers have dispersed therein one or more additives selected from the group consisting of pigments, fillers, and fire retardants in an amount up to 20% by weight.

23. The fabric of claim 18 wherein said shape is generally convex-concave.

24. The shaped fabric of claim 18 wherein said ethylene-vinyl acetate fibers are in the form of a web which is needled into the back of said higher melting point fiber fabric.

25. The shaped fabric of claim 24 wherein said higher melting point fiber is selected from the group consisting of polypropylene, polyamide and mixtures thereof.

26. The shaped fabric of claim 24 wherein said higher melting point fiber comprises polypropylene.

27. The shaped fabric of claim 24 wherein said higher melting point fiber comprises polyamide.

28. The shaped fabric of claim 24 wherein said fabric of a higher melting point fiber has a pile face.

29. The shaped fabric of claim 18 wherein the vinyl acetate content of said ethylene-vinyl acetate ranges from 5% to 20%.

* * * * *